United States Patent Office 2,897,177
Patented July 28, 1959

2,897,177
N-NITROSO BIS(ALKOXYPHENYL)PHENYLENE-DIAMINES

Ching C. Tung, Nitro, W. Va., assignor to Monsanto Chemical Company, St. Louis, Mo., a corporation of Delaware No Drawing. Application July 19, 1955
Serial No. 523,119

4 Claims. (Cl. 260—45.9)

The present invention relates to N-nitroso bis-(alkoxyphenyl)-p-phenylenediamines. This class of compounds may be represented by the structural formula

where A represents a lower alkyl group, as for example methyl, ethyl, propyl, isopropyl, butyl or amyl and R represents hydrogen or a nitroso group.

These compounds may be prepared by condensing a p-alkoxyaniline with hydroquinone in the presence of a catalyst and removing water of condensation followed by reaction of the intermediate with sodium nitrite. As illustrative of the process in detail substantially 300 grams of p-phenetidine and substantially 110 grams of hydroquinone were mixed in a suitable reaction vessel in the presence of substantially 3 grams of iodine. After the exothermic reaction subsided the mixture was heated at 230–240° C. for about 18 hours. During this heating period substantially 20 ml. of water was removed from the mass. The product was then washed with a 25% sodium hydroxide solution to remove unreacted hydroquinone and then purified by recrystallization from benzene. Substantially 34.9 grams of the N,N'-bis(p-ethoxyphenyl)-p-phenylenediamine so obtained was suspended in 300 ml. of ethanol and 24 ml. of concentrated hydrochloric acid added. The reaction mixture was cooled to 0° C. and 16 grams of sodium nitrite dissolved in 30 ml. of water then added with stirring over a period of about an hour. The residual acidity was neutralized with sodium hydroxide solution, the product removed by filtration, washed thoroughly with water and dried in an oven at 50° C. The yield was 30.2 grams of N,N'-dinitroso - N,N' - bis(p-ethoxyphenyl)-p-phenylenediamine melting at 160–165° C.

Mononitroso - N,N'-bis(p-ethoxyphenyl)-p-phenylenediamine was prepared as follows: A solution of 174 grams of N,N'-bis(p-ethoxyphenyl)-p-phenylenediamine in 400 cc. of acetone was prepared. To this solution was added a mixture of 54 grams of 37% hydrochloric acid, 1000 grams of water and a small amount of a dispersing agent. The solutions were mixed at 10–15° C. and stirred to produce the dispersion of the hydhochloride salt of the amine. A solution of 38 grams of sodium nitrite in 100 grams of water was then added slowly. The reaction mixture was stirred thoroughly and kept below 10° C. during the addition. After adding the sodium nitrite solution the reaction mixture was stirred for about 15 minutes longer and then added to a large volume of water. The product was removed by filtration, the filter cake washed thoroughly with water and dried at 50° C. to obtain a gray finely divided solid, M.P. 100–105° C. The product contained 11.0% nitrogen as compared to 11.1% nitrogen calculated for N-nitroso-N,N'-bis(p-ethoxyphenyl)-p-phenylenediamine. The yield was essentially theoretical.

The foregoing procedure gives a better yield and better quality product of N,N'-dinitroso-N,N'-bis(p-ethoxyphenyl)-p-phenylenediamine than reaction in ethanol. Doubling the quantity of hydrochloric acid and of sodium nitrite gave a yield of approximately 93% N,N'-dinitroso - N,N' - bis(p - ethoxyphenyl)-p-phenylenediamine, M.P. 168–170° C.

Further examples of the invention comprise N-nitroso-N,N' - bis(p-methoxyphenyl)-p-phenylenediamine, N,N'-dinitroso - N,N' - bis(p-methoxyphenyl)-p-phenylenediamine, and N,N'-dinitroso-N,N'-bis(p-isopropoxyphenyl)-p-phenylenediamine. The new compounds are valuable for the compounding of rubber. Vulcanizates of sulfur-vulcanizable rubbers containing the compounds are protected against exposure cracking, that is degradation due to ozone, while the rubber article is under either static or dynamic stress. Vulcanization with organic sulfide vulcanizing agents, as for example N,N'-dithiobis morpholine, together with a small amount of sulfur imparts to the vulcanizates resistance to heat aging, flex fatigue, heat buildup, cut growth and prevulcanization (scorch). The new compounds are exceptional in that vulcanizates prepared in the presence of most nitroso aromatic amines impart poor hysteresis properties.

As illustrative of the anti-exposure cracking properties, stocks were compounded comprising:

| Stock | A | B | C | D |
|---|---|---|---|---|
| | Parts by weight | | | |
| Smoked sheets | 100 | 100 | | |
| Butadiene-styrene copolymer rubber [1] | | | 100 | 100 |
| Carbon black | 50 | 50 | 50 | 50 |
| Saturated hydrocarbon softener | 3 | 3 | 10 | 10 |
| Zinc oxide | 5 | 5 | 4 | 4 |
| Stearic acid | 3 | 3 | 2 | 2 |
| Sulfur | 2.5 | 2.5 | 1.75 | 1.75 |
| N-cyclohexyl 2-benzothiazolesulfenamide | 0.5 | 0.5 | 1.2 | 1.2 |
| N,N'-dinitroso-N,N'-bis (p-ethoxyphenyl)-p-phenylenediamine | | 1.5 | | 1.5 |

[1] GR–S 1500.

Stocks A and B were cured by heating for 30 minutes in a press at 144° C. and stocks C and D were cured by heating for 60 minutes in a press at 144° C. Since evaluation under static conditions is not indicative of the service obtained with many types of rubber articles which must withstand flexing, the vulcanized compositions were evaluated under dynamic conditions in an atmosphere containing a definite concentration of ozone. The test is carried out in the following manner: Samples of the stocks are cured in the form of a belt ½" wide, ¼" thick and 5 5/16" inside diameter and mounted on 1" diameter shafts. The ozone concentration is maintained at 20–30 parts per hundred million throughout the test and the shafts are rotated at 75 r.p.m. In this manner a momentary elongation through a range of 0–20% is provided at any portion of the test specimen passing over the shaft. (The apparatus and procedure employed are described in Analytical Chemistry, vol. 25, page 241, February 1953.) The experimental test specimens were compared visually at various intervals noting the extent of cracking. A stock which is severely cracked has no service life remaining in terms of the useful life of a rubber article and where the cracking is designated as extremely severe the degradation is well beyond even this point. The results of the tests are set forth below:

Table I

| Stock | Surface cracking after flexing in ozone for— | | |
|---|---|---|---|
| | 24 hours | 32 hours | 40 hours |
| A | V. slight | V. slight | V. slight. |
| B | None | None | None. |
| C | V. slight | Slight | Moderate. |
| D | None | None | None. |

The resistance of the stocks to prevulcanization was evaluated by means of an NBS model Mooney viscometer following A.S.T.M. D1077-49T with the exception that the scorch point was taken at 10 units higher than the minimum instead of 5 units. Stocks A and B were run at 121° C. and stocks C and D were run at 135° C.

Table II

Scorch, time

Stock:
A ---------------------------------------- 19
B ---------------------------------------- 28
C ---------------------------------------- 37
D ---------------------------------------- 44

As illustrative of vulcanization in the presence of an organic sulfide vulcanizing agent and a small amount of sulfur, stocks were prepared as follows:

| Stock | E | F | G | H |
|---|---|---|---|---|
| | Parts by weight | | | |
| Smoked sheets | 100 | 100 | 100 | 100 |
| Carbon black | 50 | 50 | 50 | 50 |
| Zinc oxide | 5 | 5 | 5 | 5 |
| Saturated hydrocarbon softener | 3 | 3 | 3 | 3 |
| Stearic acid | 3 | 3 | 3 | 3 |
| N-tert. butyl-2-benzothiazolesulfenamide | 0.5 | 0.5 | 0.5 | 0.5 |
| Sulfur | 1.0 | 1.0 | 0.6 | 0.6 |
| N,N'-dithiobis morpholine | 1.0 | 1.0 | 2.0 | 2.0 |
| N,N'-dinitroso-N,N'-bis(p-ethoxyphenyl)-p-phenylenediamine | | 1.5 | | 1.5 |

The resistance of the stocks to oxygen degradation was evaluated. The stocks were cured in the usual manner by heating in a press for 45 minutes at 144° C. Set forth below are the percentages of the original tensile retained after aging for 24, 48, 72 and 96 hours at 100° C. in an air oven.

Table III

| Stock | Tensile retained in percent after aging for— | | | |
|---|---|---|---|---|
| | 24 hours | 48 hours | 72 hours | 96 hours |
| E | 77 | 54 | 30 | 19 |
| F | 94 | 77 | 54 | 48 |
| G | 72 | 51 | 32 | 27 |
| H | 92 | 74 | 62 | 45 |

The flexing resistance of the stocks was determined by elongating samples of the vulcanizates 75% of their original length at 430 cycles per minute and determining the flexings before failure. The cut growth was evaluated by inserting a 0.12" cut in India flexing specimens and determining the kilocycles to failure:

Table IV

| Stock | Extension flexing, thousands | | Cut growth (kilocycles to failure) |
|---|---|---|---|
| | Unaged | Aged | |
| E | 80 | 64 | 375 |
| F | 165 | 139 | 850 |
| G | 65 | 50 | 350 |
| H | 177 | 142 | 650 |

The improvement in flexing is significant because N-thioamine vulcanizates containing commercial antioxidants are deficient in flexing.

The foregoing and other tests established that the new compounds possess unusual properties. The presence of the alkoxy groups increases rubber solubility so that the compounds do not separate from the rubber forming a surface film (bloom). They reduce heat buildup under repeated stress, a property important for the compounding of thick rubber articles subjected to stress, as for example truck tires.

It is intended to cover all changes and modifications of the examples of the invention herein chosen for purposes of disclosure which do not constitute departures from the spirit and scope of the invention.

What is claimed is:

1. A compound of the structure

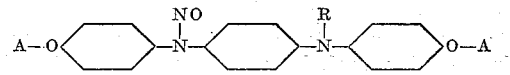

where A represents a lower alkyl group and R represents a member of the group consisting of hydrogen and a nitroso group.

2. The compound of the structure

3. A sulfur vulcanizable diene hydrocarbon rubber composition containing a small amount sufficient to inhibit exposure cracking of the compound of the structure

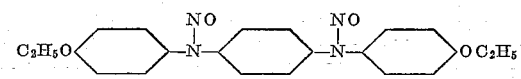

4. A vulcanizable diene hydrocarbon rubber composition containing a N,N'-dithiobis morpholine as the essential vulcanizing agent in small amount sufficient to vulcanize the rubber and a small amount sufficient to inhibit exposure cracking of a compound of the structure

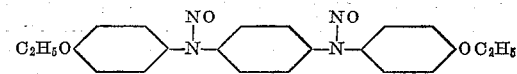

References Cited in the file of this patent

UNITED STATES PATENTS 1,869,657     Bowers _____ Aug. 2, 1932
2,109,164     Clifford _____ Feb. 22, 1938

FOREIGN PATENTS 492,803     Great Britain _____ Sept. 27, 1938

OTHER REFERENCES

Wolf: "The Compounding of Colored Butyl Rubber Goods," Chemical Abstracts, vol. 48 (1954), col. 11102h. Copy in Sci. Lib.